United States Patent
Calafell et al.

(10) Patent No.: US 10,016,717 B2
(45) Date of Patent: Jul. 10, 2018

(54) ADSORBING CONTAMINANTS FROM A GAS STREAM

(71) Applicants: Dag O. Calafell, Katy, TX (US); P. Scott Northrop, Spring, TX (US)

(72) Inventors: Dag O. Calafell, Katy, TX (US); P. Scott Northrop, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 266 days.

(21) Appl. No.: 14/853,340

(22) Filed: Sep. 14, 2015

(65) Prior Publication Data

US 2016/0129389 A1    May 12, 2016

Related U.S. Application Data

(60) Provisional application No. 62/076,258, filed on Nov. 6, 2014.

(51) Int. Cl.
*B01D 53/02* (2006.01)
*B01D 53/12* (2006.01)
(Continued)

(52) U.S. Cl.
CPC ............ *B01D 53/12* (2013.01); *B01D 53/08* (2013.01); *B01J 20/34* (2013.01); *C10L 3/101* (2013.01); *B01D 2253/104* (2013.01); *B01D 2253/106* (2013.01); *B01D 2253/108* (2013.01); *B01D 2253/112* (2013.01); *B01D 2253/116* (2013.01);
(Continued)

(58) Field of Classification Search
CPC ........ B01D 2253/104; B01D 2253/106; B01D 2253/108; B01D 2253/112; B01D 2253/116; B01D 2253/204; B01D 2253/25; B01D 2256/245; B01D 2257/304; B01D 2257/306; B01D 2257/504; B01D 2257/602; B01D 2257/702; B01D 2257/80; B01D 2259/4009; B01D 2259/4143; B01D 2259/4148; B01D 53/08; B01D 53/12; B01J 20/34; C10L 2290/10; C10L 2290/12; C10L 2290/542; C10L 3/101; Y02C 10/08

See application file for complete search history.

(56) References Cited

U.S. PATENT DOCUMENTS 4,231,764 A    11/1980 Mattia
4,448,592 A *  5/1984 Linde ............... B01D 53/047
                                                 95/130

(Continued)

FOREIGN PATENT DOCUMENTS

DE       3303038     11/1983   ............ B01D 46/34
WO    WO2011/006059   1/2011   ............ B01D 53/14

*Primary Examiner* — Christopher P Jones
(74) *Attorney, Agent, or Firm* — ExxonMobil Upstream Research Company

(57) ABSTRACT

A method and systems for adsorbing contaminants from a gas stream are provided herein. The method includes flowing the gas stream into a treating vessel and through a moving bed of adsorbents. The method includes flowing the adsorbents out of the treating vessel and into a fluidized bed of a regenerator. The method includes desorbing the contaminants from the adsorbents in the fluidized bed of the regenerator to form regenerated adsorbents. The method further includes cooling the adsorbents and returning the cooled, regenerated adsorbents to the treating vessel.

16 Claims, 7 Drawing Sheets

(51) Int. Cl.
  *B01D 53/08* (2006.01)
  *C10L 3/10* (2006.01)
  *B01J 20/34* (2006.01)

(52) U.S. Cl.
  CPC .... *B01D 2253/204* (2013.01); *B01D 2253/25* (2013.01); *B01D 2256/245* (2013.01); *B01D 2257/304* (2013.01); *B01D 2257/306* (2013.01); *B01D 2257/504* (2013.01); *B01D 2257/602* (2013.01); *B01D 2257/702* (2013.01); *B01D 2257/80* (2013.01); *B01D 2259/4009* (2013.01); *B01D 2259/4143* (2013.01); *B01D 2259/4148* (2013.01); *C10L 2290/06* (2013.01); *C10L 2290/10* (2013.01); *C10L 2290/12* (2013.01); *C10L 2290/542* (2013.01); *Y02C 10/08* (2013.01)

(56) References Cited

U.S. PATENT DOCUMENTS

| | | |
|---|---|---|
| 5,271,907 A | 12/1993 | Copeland ............... 422/178 |
| 5,904,750 A | 5/1999 | Cowles |
| 6,027,550 A | 2/2000 | Vickery |
| 7,951,740 B2 | 5/2011 | Morton et al. ............ 502/41 |
| 8,110,523 B2 | 2/2012 | Ryu et al. ............... 502/400 |
| 8,500,854 B1 | 8/2013 | Pennline et al. ........... 95/139 |
| 2006/0230930 A1 | 10/2006 | Knaebel ................... 95/96 |
| 2012/0134906 A1 | 5/2012 | Mastin et al. ............ 423/230 |
| 2012/0192711 A1 | 8/2012 | Henningsen et al. ........ 95/12 |
| 2013/0243684 A1 | 9/2013 | Drake ..................... 423/503 |

\* cited by examiner

100

300

400

700

ADSORBING CONTAMINANTS FROM A GAS STREAM

CROSS REFERENCE TO RELATED APPLICATIONS

This application claims the priority benefit of U.S. provisional patent application No. 62/076,258 filed Nov. 6, 2014 entitled method and system for ADSORBING CONTAMINANTS FROM A GAS STREAM, the entirety of which is incorporated by reference herein.

FIELD

The present techniques relate generally to the adsorption of contaminants from a gas stream. More specifically, the present techniques provide for the adsorption of contaminants using a moving bed of blended adsorbents in a treating vessel and for the regeneration of the blended adsorbents in a fluidized bed of a regenerator.

BACKGROUND

This section is intended to introduce various aspects of the art, which may be associated with exemplary embodiments of the present techniques. This description is believed to assist in providing a framework to facilitate a better understanding of particular aspects of the present techniques. Accordingly, it should be understood that this section should be read in this light, and not necessarily as admissions of prior art.

The adsorption and removal of contaminants and impurities from gas streams is becoming a significant issue as North America expands the use of its available gas resources, including its natural gas supply. Due to the advances in gas extraction, there is now a sufficient reserve of natural gas to handle much of North America's domestic energy needs for the next century. In fact, the global gas supply is projected to increase about sixty-five percent by 2040, with twenty percent of production occurring in North America.

However, before natural gas is sold commercially as a product, a variety of impurities, including hydrogen sulfide ($H_2S$), carbon dioxide ($CO_2$), heavy hydrocarbons (HHC), water ($H_2O$), mercaptans, and mercury, among other contaminants, must be removed to product specification levels. Such impurities are potentially harmful and can cause undesirable consequences in production equipment and in transportation infrastructure. For example, the $H_2O$ and $CO_2$ may freeze at liquefaction temperatures and plug production equipment, and the $H_2S$ may decrease the commercial value of the natural gas. Additionally, mercaptans, HHC, and mercury, among other contaminants, are often present in the natural gas in small concentrations. These contaminants may cause possible equipment damage or failure issues, for example, corrosion, metal embrittlement, freezing, and plugging of production equipment.

A conventional gas processing facility for the pre-treatment and production of natural gas production may include a treating vessel, such as a fixed-bed adsorption column, for the removal of contaminants and where the column may be loaded with a solid adsorbent. A suitable solid adsorbent may be selected to adsorb a specific contaminant, where the adsorbent may include, for example, molecular (mole) sieves, silica gel, and activated alumina, among others. Activated carbon is usually used for adsorption of oil and organic solvents, meanwhile silica gel and mole sieves are commonly used for adsorption of water vapor. In operation, the gas stream may enter a top inlet of the fixed-bed adsorption column and flow downward to contact the adsorbent. During the adsorption process, portions of the solid adsorbent may be substantially saturated for hours and, thus, unavailable for active adsorption. Likewise, unused portions of the solid adsorbent may not be utilized for several hours while active saturation takes place in other areas. In both cases, the solid adsorbent is under-utilized.

To desorb and remove the contaminants from the saturated solid adsorbent, a hot regeneration gas may flow through the fixed-bed adsorption column, for example, being introduced through a bottom inlet. However, the flow rate of the regeneration gas through the fixed-bed adsorption column is often limited. For example, an excessive flow rate may cause the mean particle distance of the solid adsorbent to grow, thus, causing the fixed bed to rise. As a result, the solid adsorbent may carry over into a regeneration cooler.

In the oil refinery industry, the fluid catalytic cracking (FCC) process may utilize solid catalysts to increase the speed of reactions and may incorporate regenerators for catalyst regeneration. In particular, the catalyst section of a FCC unit may include two separate vessels, i.e., a reactor and a catalyst regenerator. In operation, a hot vapor and a liquid may be fed into the reactor to fluidize the solid catalysts, which are utilized to increase the rate of reaction. After the reactions take place, the spent catalyst flows into the regenerator for regeneration. As an alternative to fluidization, the reactor of the FCC unit may utilize a moving-bed of solid catalysts that flow downward in the reactor by gravity to increase the rate of reaction.

U.S. Pat. No. 8,500,854 to Pennline et al. describes a carbon dioxide ($CO_2$) adsorption method that uses an amine-based solid sorbent for the removal of $CO_2$ from a gas stream. The method utilizes a conditioner following a steam regeneration process and provides for water loading on the amine-based solid sorbent following $CO_2$ absorption. The method may assist in optimizing the $CO_2$ removal capacity of the amine-based solid sorbent for a given adsorption and regeneration reactor.

U.S. Pat. No. 8,110,523 to Ryu et al. describes a method for preparing a dry regenerable sorbent, which includes the steps of obtaining a slurry through formulation, mixing, comminuting and dispersion of the sorbent raw materials. The method also includes the steps of forming the slurry, spray drying it to produce sorbent particles, then calcining the sorbent particles. In the step of obtaining a slurry, organic additives (e.g., dispersant, a flow control agent, and an organic binder) are used to obtain a well-dispersed, stable and free-flowing slurry in which the raw materials are present below a sub-micron level (e.g., nanosize). The organic additives are removed and decomposed through the calcining. The use of the hydrophilic and high specific surface area support allows the dry regenerable sorbent to have a high reactivity. The solid active component is used instead of a liquid amine. In addition, the sorbent can be re-used through continuous sorption and regeneration processes.

United States Patent Application Publication No. 2012/0192711 by Henningsen et al. describes a fluidized reactor system for removing impurities from a gas. The system includes a fluidized absorber for contacting a feed gas with a sorbent stream to reduce the impurity content of the feed gas and a fluidized solids regenerator for contacting an impurity-loaded sorbent stream with a regeneration gas to reduce the impurity content of the sorbent stream. The system includes a first non-mechanical gas seal forming solids transfer device to receive an impurity-loaded sorbent stream from the absorber, and transport the impurity loaded sorbent stream to the regenerator at a controllable flow rate in response to an aeration gas. The system also includes a second non-mechanical gas seal forming solids transfer device to receive a sorbent stream of reduced impurity content from the regenerator and to transfer the sorbent stream of reduced impurity content to the absorber without changing the flow rate of the sorbent stream.

The removal of contaminants to produce commercial grade natural gas often includes the use of adsorbents to adsorb and remove the contaminants from raw natural gas. After active adsorption of the contaminants, the spent adsorbents may be regenerated to desorb the contaminants and to form regenerated adsorbents for continued use in the adsorption process. Accordingly, there is a need to provide techniques to efficiently utilize and regenerate adsorbent particles.

SUMMARY

An exemplary embodiment provides a method for adsorbing contaminants from a gas stream. The method includes flowing the gas stream into a treating vessel and through a moving bed of adsorbents to adsorb contaminants in the gas stream. The method includes flowing the adsorbents out of the treating vessel and into a fluidized bed of a regenerator. The method includes desorbing the contaminants from the adsorbents in the fluidized bed of the regenerator to form regenerated adsorbents. The method includes cooling the adsorbents and returning the cooled, regenerated adsorbents to the treating vessel.

Another exemplary embodiment provides a system for adsorbing contaminants from a gas stream. The system includes a blend of adsorbent particles, where the blend of adsorbent particles include different adsorbent types to adsorb contaminants in the gas stream. The system includes a treating vessel including the blend of adsorbent particles and configured to flow the gas stream in a counter-current direction through the blend of adsorbent particles. The system includes a regenerator configured to flow the blend of adsorbent particles through a fluidized bed of the regenerator and return a regenerated blend of adsorbent particles to the treating vessel.

Another exemplary embodiment provides a method of blending different adsorbent types to form a blended moving bed of adsorbent particles. The method includes selecting a plurality of adsorbents to adsorb a plurality of contaminants, where the adsorbents are based on the type of contaminants. The method includes blending the plurality of adsorbents and feeding the blend of adsorbents through a treating vessel as a blended moving bed of adsorbents.

DESCRIPTION OF THE DRAWINGS

The advantages of the present techniques are better understood by referring to the following detailed description and the attached drawings, in which.

DETAILED DESCRIPTION

Figure 1:
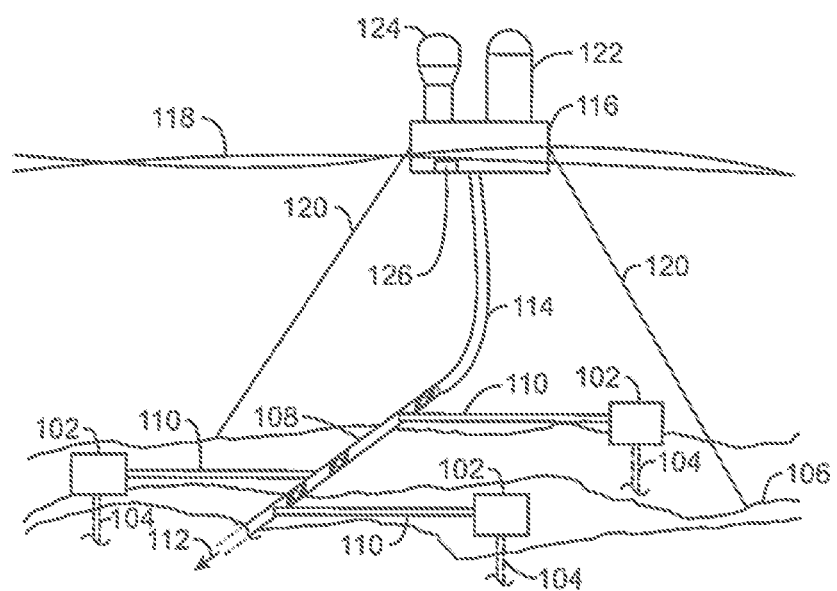
FIG. 1 is an illustration of a natural gas field.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

The term "about" means plus or minus 10% of the indicated numerical value, unless otherwise specified.

The term "adsorption" is a process by which a gaseous or dissolved material adheres to the surface of a solid but does not penetrate the surface of that solid.

The term "adsorption column" or "treating vessel" refers to a mass transfer device that enables a solid adsorbent(s) to selectively adsorb a contaminant from a fluid containing one or more other contaminants.

The term "adsorbent" refers to any material or combination of materials capable of adsorbing a component. The adsorbent is usually porous in nature with a relatively high surface area that can adsorb substances, e.g., contaminants, onto its surface with the help of intermolecular forces.

The term "contaminant" refers to a material, such as a compound, an element, a molecule, or a combination of molecules up to and including particulate matter, that are present in an input gas and are not desired in the final treated gas. The contaminants can be solid, liquid or gaseous.

The term "desorption" or "desorb" refers to the removal of an adsorbed molecule from an adsorbent by imparting sufficient energy to the adsorbed molecule for it to emerge from an interface of the adsorbent, e.g., surface, pores, etc., in which it is trapped.

The term "feed stream" or "gas stream" refers to a composition prior to any treatment, such as cleaning, dehydration, or scrubbing, as well as any composition having been partly, substantially or wholly filtered for the reduction, removal, or both of one or more compounds or substances.

The term "fluidization" refers to a process whereby a fluid flow percolating through a granular material makes the material behave as a liquid. This process occurs when a fluid (e.g., liquid or gas) passes upward and through the granular material.

The term "fluidized bed" refers to a system of dense phase solid particles having a fluid flowing upwardly through the particles at a velocity above the minimum velocity of the fluid required to maintain full suspension of the solid particles.

The term "moving bed" refers to a bed of solid particles that slide together through a vessel. The flow within the moving bed of solid particles may be the result of gravity or mechanical forces. Once the relative positions of the particles are established as the particles enter the vessel, those positions may remain substantially similar throughout the vessel. Towards the end of the vessel, the sliding bed of particles may be disrupted, causing the particles to flow over one another as they exit the vessel.

The term "particle density" refers to the density of a particulate solid or powder. The particle density is measure as the weight of a specific volume of the solid or powder in a specific medium, e.g., air.

The term "particle size," as used herein, includes hydrodynamic or aerodynamic particle size. The particle size equals the diameter of a sphere that has the same drag coefficient as the given particle.

The term "substantially" and other words of degree refers to relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic.

Overview

Before a natural gas can be further processed for commercial use, many types of contaminants may be removed to low levels, including $H_2S$, mercaptans, $CO_2$, heavy hydrocarbons (HHC), $H_2O$, and mercury. In some cases, solid adsorbents can be used to reduce the concentration of such contaminants to acceptable levels. Reducing the time that saturated or unsaturated solid adsorbents are idle may increase the efficiency of the adsorption process. Accordingly, in embodiments described herein, a moving bed of adsorbents may be used to substantially remove a series of contaminants followed by regenerating the adsorbents on a continuous basis, after the contaminants have been adsorbed. The moving bed of adsorbents may include a blend of various types of adsorbents to adsorb different types of contaminants. After adsorption, the adsorbents can be transferred to a regenerator, in which the adsorbents are fluidized during regeneration. To maintain the adsorbents in a consistent blend during regeneration, the particles of the different adsorbents may have a similar particle size and density. The continuous, or possible intermittent, withdrawal and regeneration of the blended adsorbents may provide efficient adsorbent reuse and effective contaminant removal.

FIG. 1 is an illustration of a natural gas field 100. The natural gas field 100 can have a number of wellheads 102 coupled to wells 104 that produce hydrocarbons from a formation (not shown). As shown in this example, the wellheads 102 may be located on the ocean floor 106. Each of the wells 104 may include single wellbores or multiple, branched wellbores. Each of the wellheads 102 can be coupled to a central pipeline 108 by gathering lines 110. The central pipeline 108 may continue through the field 100, coupling to further wellheads 102, as indicated by reference number 112. A flexible line 114 may couple the central pipeline 108 to a collection platform 116 at the ocean surface 118. The collection platform 116 may be, for example, a floating processing station, such as a floating storage and offloading platform (or FSOP), that is anchored to the ocean floor 106 by a number of tethers 120 or it may be an on-shore facility.

For natural gas production, the collection platform 116 may have equipment for processing, monitoring, and storing the harvested hydrocarbons and the like, including a gas purification section, e.g., a moving bed adsorption column 122 and a fluidized bed regenerator 124. The collection vessel 116 may export the processed natural gas to shore facilities by pipeline (not shown).

Prior to processing of the hydrocarbons on the collection platform 116, the concentration of components in the production fluids brought up the flexible line 114 from the central pipeline 108 may be monitored, for example, by a gas analyzer 126 located at the collection vessel 116 or at any number of other points in the natural gas field 100. The gas analyzer 126 may determine the concentration of the components of the natural gas including, for example, $H_2S$, $CO_2$, heavier hydrocarbons (HHC), $H_2O$, mercaptans, mercury, hydrogen, nitrogen, and other types of impurities. In some embodiments, the gas analyzer 126 may include a flame photometric detector gas chromatograph (FPD GC), a mass spectrometer, an x-ray fluorescence (XRF) detector, or Fourier-transform infrared (FTIR) spectrometer.

The moving bed adsorption column 122 may include solid adsorbents to remove the components of the natural gas during an adsorption process. After the adsorption process but before the solid adsorbents reach a top-inlet of the moving bed adsorption column 122 and flow out of the column 122 with a treated gas stream, the saturated adsorbents may be moved to the fluidized bed regenerator 124 to desorb and remove the contaminants. The removal of the saturated adsorbents from the adsorption column 122 and into the fluidized bed regenerator 124 and the feeding of regenerated adsorbents back into the adsorption column 122 may be carried out in a continuous process. The facilities and arrangement of the facilities are not limited to that shown in FIG. 1, as any number of configurations and other facility types may be used in embodiments.

Figure 2:
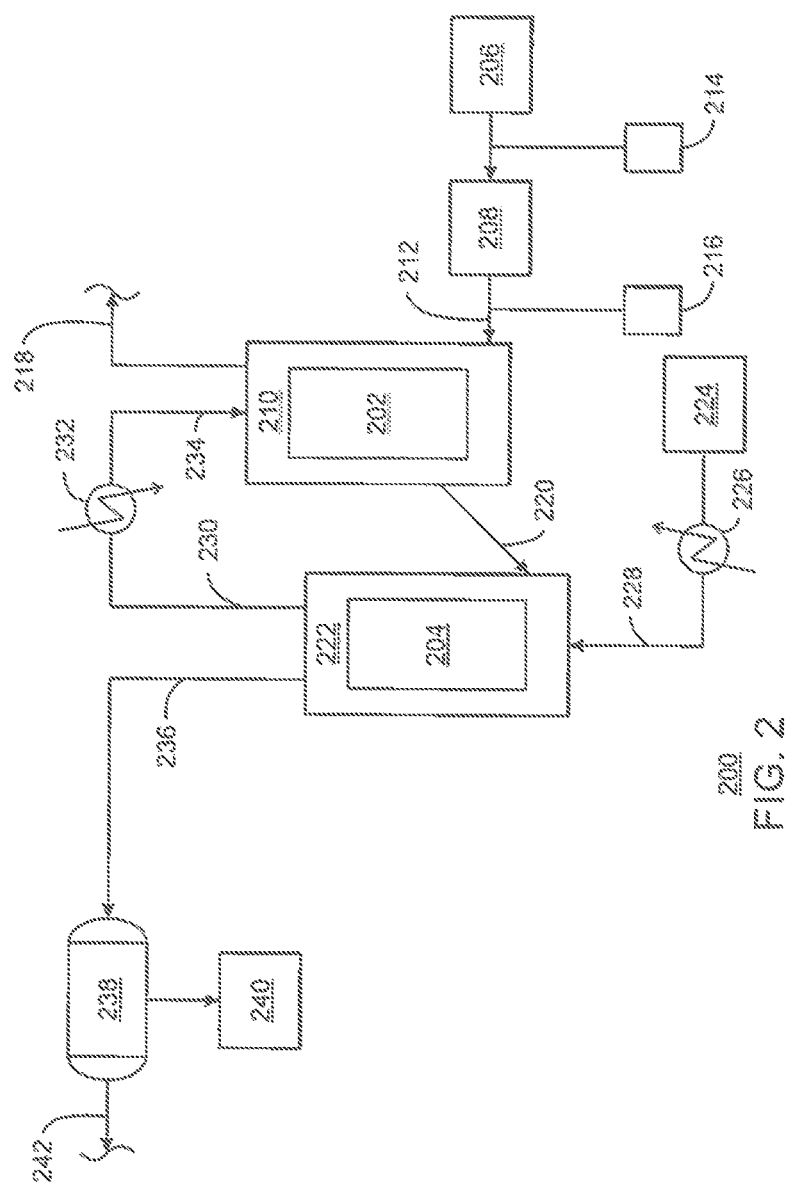
FIG. 2 illustrates a block diagram of a system including a moving bed of blended adsorbents and a fluidized bed of blended adsorbents.

FIG. 2 illustrates a block diagram of a system 200 including a moving bed of blended adsorbents 202 and a fluidized bed of blended adsorbents 204. To protect the processing equipment, a feed gas 206, which may be untreated, may be filtered before it is further processed. As shown in FIG. 2, the feed gas 206 may flow into a filter-coalescer 208 to pre-treat the gas before feeding it into a treating vessel, e.g., an adsorption column 210. The filtering process may include removing any entrained liquid or solid particles that may be present in the feed gas 206 to generate a filtered feed gas 212. In some embodiments, the feed gas 206 and the filtered feed gas 212 may be monitored using analyzers 214 and 216 before or after filtration in order to determine the initial concentration of contaminants that flow into the adsorption column 210.

The filtered feed gas 212 may contain contaminants not readily removed during filtration. Thus, the filtered feed gas 212 may flow into the adsorption column 210 for further contaminant removal. During an adsorption process, an untreated feed gas may flow through solid adsorbents where contaminant molecules may stick to active sites, e.g., on the surface of the adsorbents or in pores of the adsorbents, and continue to adhere to the surface of the adsorbent until removed by desorption, e.g., during a regeneration process.

In some embodiments, a blend of different solid adsorbents is added to the adsorption column 210 to form the moving bed of blended adsorbents 202 to adsorb the various contaminants within the filtered feed gas 212. Further, the blended adsorbents may be regenerable and thus, may include adsorbent particles with similar hydrodynamic characteristics to withstand fluidization and heating during regeneration. The use of various types of adsorbents in the blend will be discussed in more detail with respect to FIG. 3.

As depicted in FIG. 2, the filtered feed gas 212 may be introduced into the bottom of the adsorption column 210 so as to flow upward in the adsorption column 210. The moving bed of blended adsorbents 202 may move downward in a counter-current flow pattern against the filtered feed gas 212. As a result, as the filtered feed gas 212 flows upward, the moving bed of blended adsorbents 202 may adsorb the various contaminants within the filtered feed gas 212 as it moves downward. Thus, the filtered feed gas 212 may be decontaminated as it flows upwards to produce a treated gas stream 218 since contaminants may be adsorbed from the filtered feed gas 212 to a surface of the solid adsorbents, and into the pores thereof. After contaminant removal, the treated gas stream 218 may exit the adsorption column 210 to be further processed in a liquefaction process, sold into a pipeline, or stored for commercial usage.

During the adsorption process, the adsorbents in the moving bed of blended adsorbents 202 may lose their ability to adsorb contaminants as the active sites are filled. Accordingly, a spent adsorbent blend 220 may be removed on a continuous basis from the bottom of the adsorption column 210 to flow into a fluidized bed regenerator 222 for regeneration. This may limit the amount of time the spent adsorbent blend 220 is substantially saturated with contaminants. As a result, contamination of the treated gas stream 218 may be lessened or alleviated since the regeneration process provides a continuous supply of reactivated adsorbents to the adsorption column 210.

The fluidization of the spent adsorbent blend 220 may occur by introducing a regeneration gas 224 into a bottom inlet of the fluidized bed regenerator 222. In some embodiments, the regeneration gas 224 may be initially heated by a heater 226, such as a reboiler, heat exchanger, or furnace, to generate a hot, pressurized gas 228. The temperature of the hot, pressurized gas 228 may be in a range of about 300° F. (about 150° C.) to about 650° F. (about 345° C.). Further, the pressure of the hot, pressurized gas 228 may be in a range of about 4 psi (about 29 kPA) to about 7 psi (about 50 kPA). The regeneration gas 224 may be, for example, a portion of the filtered feed gas 212, or the treated gas stream 218 or other types of clean gas so as not to jeopardize production purity.

To provide a sufficient amount of the hot, pressurized gas 228 to induce fluidization, the flow velocity of the gas 228 may be set to about 4 cm/s to about 50 cm/s in order to provide a sufficient pressure drop across the fluidized bed. The particles in the spent adsorbent blend 220 may begin to float and collide in a chaotic motion in the treating vessel when a critical velocity of the hot, pressurized gas 228, herein termed as a minimum fluidization velocity ($U_{mf}$) of the hot, pressurized gas 228, is reached. The fluidization process increases the heat and mass transfer between the spent adsorbent blend 220 and the hot, pressurized gas 228 over a static regeneration process. As a result, the time for regeneration may be decreased, as compared to regeneration in a fixed-bed adsorption column. This may reduce the overall heat requirement for the system 200 and lower the stress on the adsorbents. As the particles of the spent adsorbent blend 220 are subjected to the flow of the hot, pressurized gas 228, the contaminants may be desorbed from the solid adsorbents to produce a fresh adsorbent blend 230.

The fresh adsorbent blend 230 may be cooled by passing through a chiller 232 to generate a cooled adsorbent blend 234 before entering the adsorption column 210. In some embodiments, the fresh adsorbent blend 230 may be cooled to a temperature in a range of about 64° F. (about 18° C.) to about 80° F. (27° C.). The displaced contaminants, along with the hot, pressurized gas 228, may exit the fluidized bed regenerator 222 as a waste stream 236. The waste stream 236 may enter a stripping vessel 238, for example, a condenser, where contaminants 240, such as HHC and water, may be separated and removed from the waste stream 236 to generate a clean regeneration gas 242. The clean regeneration gas 242 may be recycled to the fluidized bed regenerator 222 via a compressor or a blower (not shown) for use in additional desorption cycles. The facilities and arrangement of the facilities is not limited to that shown in FIG. 2, as any number of configurations and other facility types may be used in embodiments.

Figure 3:
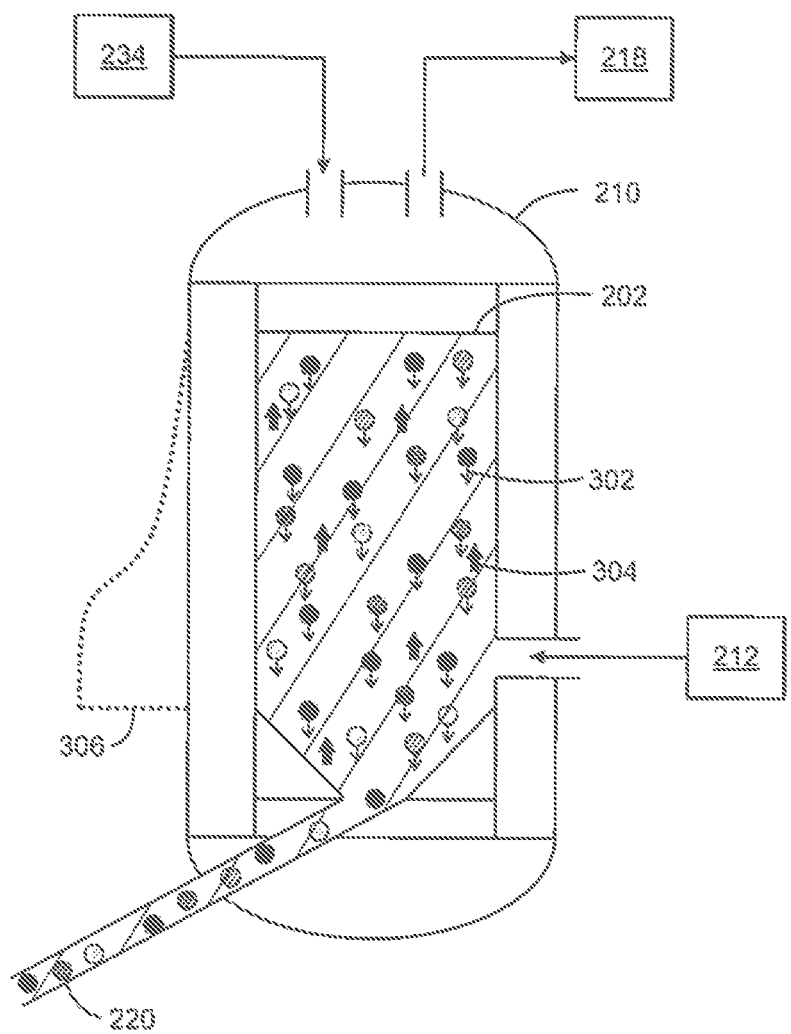
FIG. 3 is a detailed illustration of the moving bed of blended adsorbents.

FIG. 3 is a detailed illustration 300 of the moving bed of blended adsorbents 202. Like numbers are as described with respect to FIG. 2. The initial selection of the type of adsorbents utilized in the adsorption column 210 may be based on feed parameters such as the composition, pressure, and the temperature of the feed gas, the types and nature of the contaminants in the feed gas, as well as the desired end-product specifications. For example, the gas cleaning process may involve the removal of contaminants including $H_2S$, $CO_2$, HHC, $H_2O$, mercaptans, and mercury, among others. These contaminants may concentrate to unacceptably high levels during gas processing. Additionally, the adsorbents may be selected based on the particular types of adsorbents that can be blended together to maintain a consistent blend during and after fluidization.

A molecular (mole) sieve may be one adsorbent within the adsorption column 210 that can be utilized for the removal of the contaminants. A mole sieve is a microporous crystalline solid material containing charged active sites that may actively adsorb contaminants. The mole sieve usually exhibits a uniform pore size that may be tuned to be highly selective to certain contaminants. The standard mole sieve pore sizes may be presented in Angstrom (A) units, including 3 A, 4 A, 5 A, and 10 A (13×) types. For example, zeolites, including crystalline metal aluminosilicates, which are a special class of mole sieves, may include a pore size range of about 3 A to about 4 A. In some embodiments, for $H_2O$ vapor, $H_2S$, and $CO_2$ contaminants, a 4 A type mole sieve may be utilized to remove the contaminants.

In addition to conventional mole sieves, the adsorbents may further include modified mole sieves, such as a metal-organic-framework (MOF) mole sieve or an amine-treated mole sieve. These types of adsorbents can be utilized to adsorb $H_2S$ from the filtered feed gas 212. In various embodiments, the MOF mole sieve or a deca-dodecasil 3R (DDR) zeolite mole sieve may be used to adsorb higher concentrations of $CO_2$.

Other modified mole sieves are within the scope of this disclosure and may be optionally selected and/or employed. For example, mercaptans may be too large to fit through the pores of a 3 A, 4 A, or 5 A mole sieve. Thus, a larger pore mole sieve, such as a 13× mole sieve, may be implemented as the adsorbent to meet the maximum allowable specifications.

Activated alumina may be still another adsorbent used in the adsorption column 210 and may provide a low-pressure drop to minimize channeling. Activated alumina has a non-uniform pore size and a substantial surface area, and is made of aluminum oxide. Accordingly, it may be used to adsorb $H_2O$ vapor and HHC. Additionally, if higher concentrations of $CO_2$ are found in an untreated gas, activated alumina may be used for adsorption of the contaminant. The pores in activated alumina may range from about 2.0 nanometers (nm) to about 10.0 nm. Silica gel may be used to remove water vapor or heavy hydrocarbons. Silver-impregnated mole sieve may be used to remove mercury from a gas stream. Accordingly, based on the types of contaminants, among other feed parameters, of the filtered feed gas 212, various types of adsorbents may be blended together to form a blend of adsorbents to adsorb the various types of contaminants.

The moving bed of blended adsorbents 202 enables continuous withdrawal of spent adsorbent and continuous feeding of fresh adsorbent. In particular, the moving bed of blended adsorbents 202 may encompass a substantial length of the adsorption column 210 so that active adsorption may take place along a longer length of a mass transfer zone (MTZ). The MTZ is where active adsorption takes place and includes the length where the moving bed of blended adsorbents 202 goes from unsaturated to saturated. Within the MTZ, the degree of contaminant saturation for the adsorbents may vary from about 100% to about 0% in a conventional fixed-bed adsorption column. In comparison, in the adsorption column 210 as shown in FIG. 3, the percentage of the moving bed of blended adsorbents 202 that is either 100% saturated or 0% saturated may be greatly reduced. Thus, the percentage of unavailable or underutilized adsorbent may be decreased and adsorption of undesirable contaminants may proceed at a faster pace. In some embodiments, the moving bed of blended adsorbents 202 may move downward, as indicated by arrow 302, in the adsorption column 210 at a flow velocity of about 0.4 cm/s to about 4 cm/s. Concurrently, the filtered feed gas 212, as indicated by arrow 304, may flow in an upward direction at a flow velocity of about 2 cm/s to about 9 cm/s. Thus, the flow rate of the moving bed of blended adsorbents 202 and the flow rate of the filtered feed gas 212 may be substantially balanced so that the solid adsorbents are not fluidized in the adsorbent bed. After the adsorption process, the treated gas stream 218 may exit the adsorption column 210 with a relatively purity of about 99.9% and above. The relatively purity is usually stated in terms of remaining impurities, e.g., 4 ppm $H_2S$, 50 ppm $CO_2$, or 0.1 lb. $H_2O$/MMCF, for example.

The various types of adsorbents within the moving bed of blended adsorbents 202 may each include a MTZ profile. For example, a concentration profile 306 is an example of the MTZ of one particular type of adsorbent within the moving bed of blended adsorbents 202. In particular, the concentration profile 306 corresponds to an adsorbent utilized to remove $H_2O$. As depicted, the profile 306 may reach a plateau as it contacts saturated gas entering the bottom of the adsorption column 210, e.g., in a counter-current flow approach. As regenerated adsorbent, i.e., cooled adsorbent blend 234, enters the top of the adsorption column 210, the concentration of adsorbed water is minimal in that region. As the cooled adsorbent blend 234 moves down the bed, it picks up more water from the gas until it reaches a level of maximum $H_2O$ saturation, resulting in the sigmoidal concentration profile. Further, other MTZ profiles, based on the types of adsorbents and contaminants, may be exhibited during adsorption. In some cases, it may be possible to adjust the relative amount of regenerated adsorbents before reintroduction into the treating vessel. Online monitoring of contaminant levels in treated stream 218 could be used to determine if additional quantities of a certain adsorbent are needed, for example. After adsorption, the spent adsorbent blend 220 may be regenerated in a regenerator (not shown), which will be discussed in greater detail with respect to FIG. 4.

Figure 4:
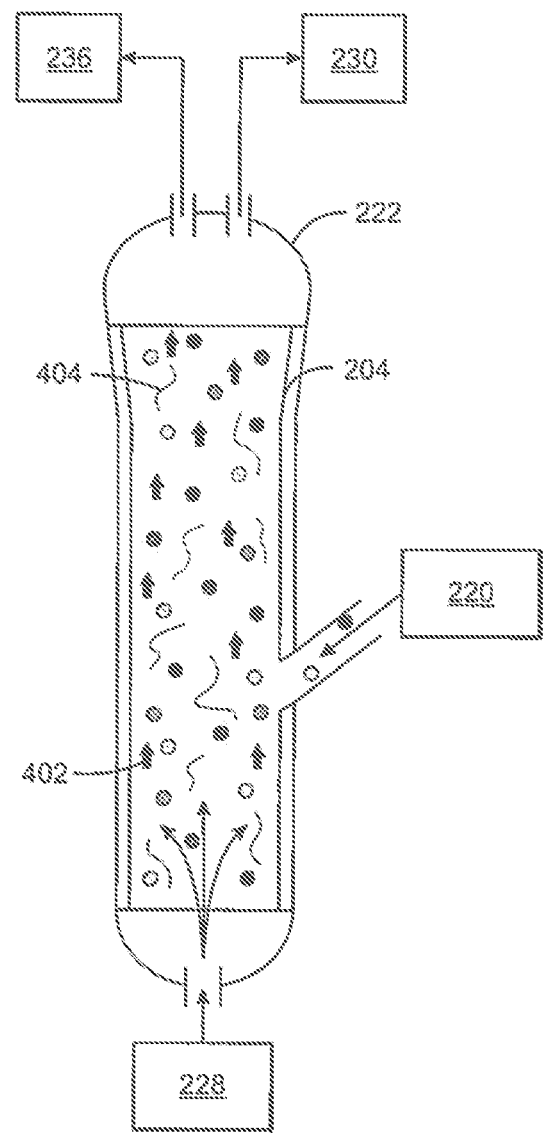
FIG. 4 is a detailed illustration of the fluidized bed regenerator.

FIG. 4 is a detailed illustration 400 of the fluidized bed regenerator 222. Like numbers are as described with respect to FIG. 2. The spent adsorbent blend 220 may flow into the fluidized bed regenerator 222 to be thermally regenerated by an upward concurrent flow of a hot, pressurized gas 228, as indicated by arrow 402. In particular, the particles within the fluidized bed of blended adsorbents 204 may move in a chaotic pattern, as indicated by arrow 404, so as to flow and slide pass each other. In some embodiments, the hot, pressurized gas 228 may include a velocity rate of about 8 cm/s to about 50 cm/s. The heat from the hot, pressurized gas 228 may desorb contaminants that have adhered to the surface and within the pores of the adsorbent particles. In some embodiments, the amount of fresh adsorbent blend 230 generated can be adjusted before reintroduction into the treating vessel 210, as desired.

During fluidization, the adsorbent particles may include various sizes and densities. Thus, particles that are less dense and that have a smaller diameter may rise and congregate above more dense, larger diameter particles. As a result, the particles may be purposely separated during fluidization. However, the fluidized bed of blended adsorbents 204 may need to maintain its blended nature during and after fluidization. For example, after regeneration, a moving bed of reactivated adsorbents may require a blended composition in order to adequately adsorb the various contaminants as it moves downward in the adsorption column 210. However, if the blended composition of the particles is lost during fluidization, it may be possible that contaminant removal may not be fully accomplished. In an effort to alleviate separation of the adsorbent particles, and thus, inconsistent adsorption, the various adsorbents may be blended together based on corresponding parameters. The corresponding parameters may include utilizing adsorbents of a similar particle size and particle density. In other words, the particle size of the various adsorbents may be adjusted to substantially match fluidization characteristics. Thus, due to similar particle size and density for the different types of adsorbents within the fluidized bed regenerator 222, the spent adsorbent blend 220 may maintain its blended nature while subjected to fluidization.

In some embodiments, use of the Geldart Classification with respect to known hydrodynamic parameters, including the minimum fluidization velocity ($U_{mf}$) and the minimum bubbling velocity ($U_{mb}$), may provide the insight needed to form a solid adsorbent blend that may maintain its blended nature during fluidization. For example, the use of the Geldart Classification, along with knowledge of the hydrodynamic properties of particular particles, may aid in selecting and blending different types of adsorbents particles with corresponding particle sizes and particle densities. As a result, an adsorbent blend that maintains its blended nature during and after fluidization may be generated.

The Geldart Classification is an empirical classification for granular materials based on their fluidization properties, including particle size and density, to provide an prediction of fluidization behavior under specified conditions. The following is a table that describes the Geldart Classification Groups.

TABLE I

Geldart Classification Groups

| | Mean Particle Size | Particle Density |
|---|---|---|
| Group A | Less than 30 μm | Less than 1.4 g/cm$^{-3}$ |
| Group B | 150 μm to 500 μm | 1.4 g/cm$^{-3}$ to 4.0 g/cm$^{-3}$ |
| Group C | Less than 30 μm | 0.3 g/cm$^{-3}$ to 5 g/cm$^{-3}$ |
| Group D | 500 μm to 1000 μm | 0.3 g/cm$^{-3}$ to 9 g/cm$^{-3}$ |

Group A particles include a small mean particle size and a low particle density so that the solids may be fluidized at relatively low gas velocities and with controlled bubbling. In some instances, Group A particles may not promote maximum bubble size greater than 10 cm. As a result, fluidization within the fluidized bed may be smooth and homogenous since less solid circulation is exhibited as compared to larger particles.

Unlike Group A, Group B particles may exhibit the formation of bubbles at the onset of fluidization. Since Group B particles are not usually associated with a maximum stable bubble size, such particles may fluidize with relative ease and may be utilized in a wide range of fluidization unit operations. For example, the majority of gas-solid reactions occur in Group B due to its range of particle sizes and densities.

Group C particles are dense, fine powders, and thus, may be difficult to fluidize due to large inter-particle forces between the particles. Group C particles are considered cohesive and usually exhibit channeling during fluidization. Accordingly, Group C particles may be fluidized with the aid of baffles, mechanical vibration, or both. In some instances, larger group particles (e.g., Group B), may be added to promote smoother fluidization.

Group D particles have the largest particle size and particle density of the Geldart groups. As a result, the gas requirements for fluidization may be large, thus, fluidization may be difficult to initiate. Unlike Group B particles, as velocity increases, a jet can be formed in the fluidized bed and solid adsorbents may be blown out with the jet in a spouting motion. Moreover, if the gas distribution is uneven, spouting behavior and severe channeling can be expected.

Those of skill in the art will appreciate that the above descriptions are not comprehensive, and alternate embodiments may select various sizes (such as Group D) based on factors not described above, e.g., cost, availability, ease of filtration, materials interactions, etc. All such alternate embodiments and materials selections are considered within the scope of this disclosure.

In addition to selecting adsorbents based on a particular size and density with respect to the Geldart Groups, the hydrodynamic parameters of the fluidized bed, including the $(U_{mf})$ and the $(U_{mb})$, may be useful in determining an appropriate solid adsorbent blend. The $(U_{mf})$ may be defined as the velocity at which all solid particles in the fluidized bed start to float, i.e., the onset of fluidization, when subjected to a gas flow. As the flow rate of the gas increases, the $(U_{mf})$ may mark the point of gas bubble formation where more intensive gas and solid particle mixing within the fluidized bed may occur. The organized circulation and chaotic movement of the solid particles caused by the bubbles may lead to effective particle blending, uniform temperatures, and favorable mass and heat transfer, among other favorable conditions. Thus, the axial and radial movement of the particles may be influenced not only by the particle size and density but also by gas velocity for effective solid circulation.

Furthermore, during the selection of different solid adsorbents for use in the blend, the mechanical strength of a specific adsorbent may present several practical factors to consider. For example, during fluidization, weaker and more fragile adsorbent particles may easily break into fines due to collisions with other particles. As a result, certain adsorbents, e.g., silica gels, may not be utilized under particular hydrodynamic parameters. The facilities and arrangement of the facilities is not limited to that shown in FIG. 4, as any number of configurations and other facility types may be used in embodiments.

Figure 5:
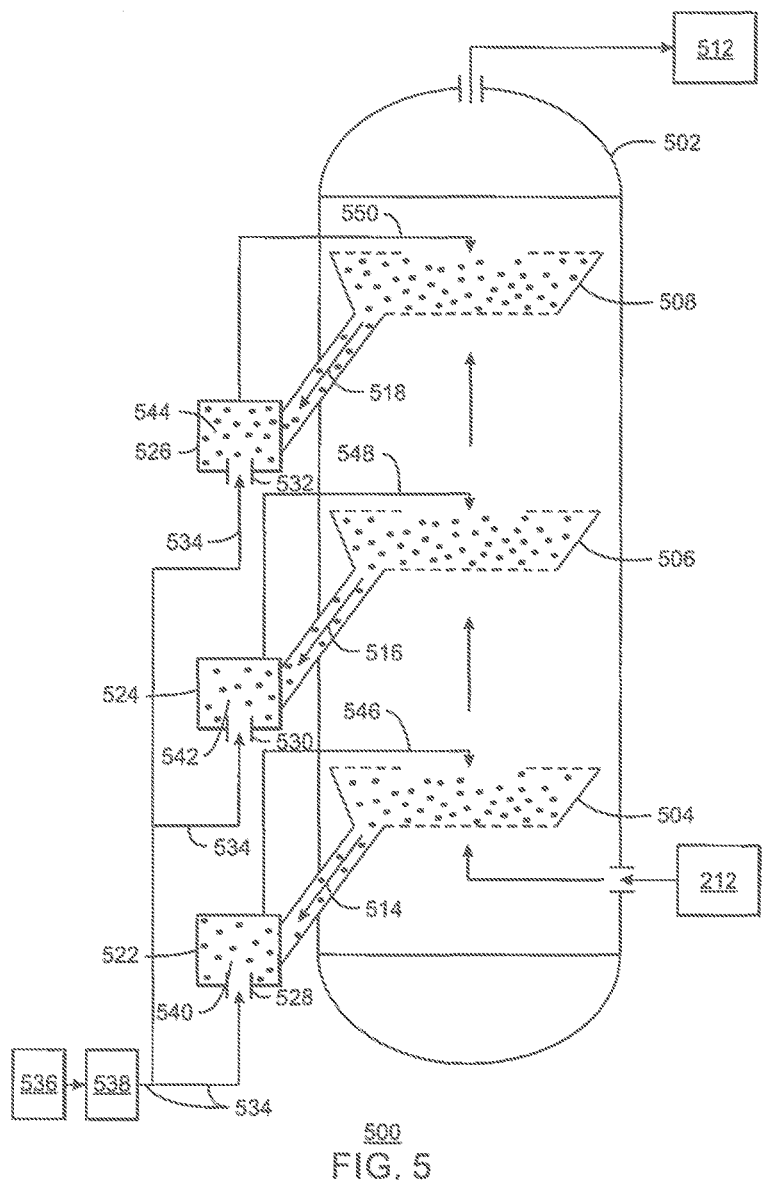
FIG. 5 is an illustration of a system for the adsorption of contaminants and the regeneration of adsorbent particles.

FIG. 5 is an illustration of a system 500 for the adsorption of contaminants and the regeneration of adsorbent particles. Like numbers are as described with respect to FIG. 2. In some embodiments, a treating vessel 502 may include v-shaped trays 504, 506, 508 with bottom screens that may be configured in a stacked order and may each contain different types of adsorbents or adsorbent blends. The filtered feed gas 212, which may contain contaminants, may flow upward through the screens into the v-shaped trays 504, 506, 508. Once in contact with the adsorbents in each of the v-shaped trays 504, 506, 508, contaminant molecules may be removed from the filtered feed gas 212 by the adsorbents. After removal of the contaminants, a treated gas 512 may exit the treating vessel 502 to be further processed. As in conventional adsorption systems, the most strongly held contaminant in an untreated gas may be the first contaminant to be adsorbed. For example, $H_2O$ may often be the most strongly adsorbed contaminant. Thus, one of the initial adsorbents to be contacted may be chosen based on its ability to capture a substantial amount of $H_2O$.

For example, the first v-shaped tray 504 may include a particular blend of adsorbents to substantially capture $H_2O$ from among other types of contaminants within the filtered feed gas 212. As the filtered feed gas 212 moves upward in the treating vessel 502, each v-shaped tray 506 and 508 may include a unique blend of adsorbents to capture contaminants that may have less or more of an affinity to particles of a particular adsorbent.

After some period of adsorption, the blend of adsorbents in each v-shaped tray 504, 506, 508 may need to be regenerated to remove the adhered contaminants A spent adsorbent blend 514, 516, 518, for each v-shaped tray 504, 506, 508, may exit the treating vessel 502 and enter separate fluidized bed regenerators 522, 524, 526. In some embodiments, the fluidized bed regenerators 522, 524, 526 may be physically attached to the treating vessel 502 or may be separate components adjacent to the treating vessel 502.

Each fluidized bed regenerator 522, 524, 526 may include a bottom inlet 528, 530, 532 for the flow of a hot, pressurized gas 534 that may be used to regenerate each spent adsorbent blend 514, 516, 518. As shown in FIG. 5, a regeneration gas 536 may be initially heated by a regeneration heater 538 to produce the hot, pressurized gas 534. Various lines of the hot, pressurized gas 534 may be directed to each bottom inlet 528, 530, 532 to supply an adequate amount of gas velocity to fluidize each spent adsorbent blend 514, 516, 518 to form a fluidized bed of blended adsorbents 540, 542, 544. The heat from the hot, pressurized gas 534 may lessen the affinity of the adsorbents for the contaminants so as to release the contaminants. The hot, pressurized gas 534 picks up the contaminants, and is routed to a cooler (not shown) to condense out at least a portion of the water and other condensable contaminants. As discussed with respect to FIG. 2, since the fluidized bed of blended adsorbents 540, 542, 544 may include adsorbents of corresponding particles sizes and densities, each adsorbent blend may maintain a blended composition so that separation based on particle features (e.g., particle size, particle density) does not occur.

At the end of the regeneration step, the adsorbent is cooled and a fresh adsorbent blend 546, 548, 550 may exit each fluidized bed regenerator 522, 524, 526 and return to its appropriate v-shaped tray 504, 506, 508. The facilities and arrangement of the facilities is not limited to that shown in FIG. 5, as any number of configurations and other facility types may be used in embodiments.

Figure 6:
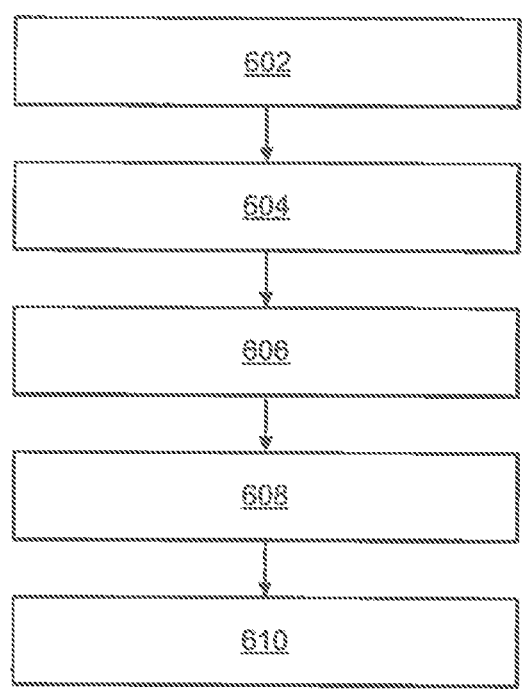
FIG. 6 is a method of adsorbing contaminants from a gas stream.

FIG. 6 is a method 600 of adsorbing contaminants from a gas stream. At block 602, a gas stream may flow into a treating vessel and through a moving bed of adsorbents, e.g., having adsorbents moving in an at least partially counter-current flow. At block 604, the adsorbents may flow out of the treating vessel and into a fluidized bed regenerator for regeneration of adsorbent particles, e.g., in a concurrent flow path. At block 606, during fluidization of the adsorbents, the adsorbed contaminants may be desorbed from the adsorbents in the fluidized bed regenerator. At block 608, the adsorbents may be cooled before being returned to the treating vessel, at block 610.

Figure 7:
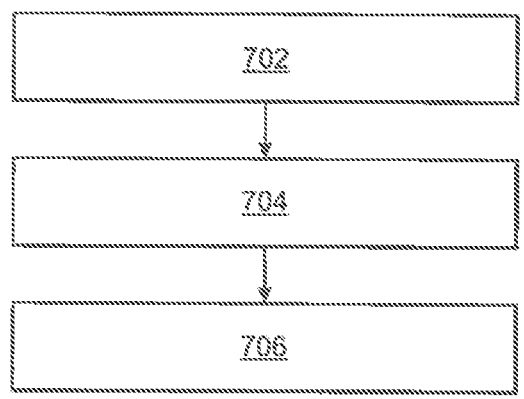
FIG. 7 is a method of blending different adsorbent types to form a blend of adsorbents.

FIG. 7 is a method 700 of blending different adsorbent types to form a blend of adsorbents. At block 702, a plurality of adsorbents may be selected to adsorb a plurality of contaminants, where the adsorbents are based on the types of contaminant to be adsorbed. At block 704, the plurality of adsorbents may be blended to form a blend of adsorbents. At block 706, the blend of adsorbents may be fed to a treating vessel to form a moving bed of blended adsorbents to adsorb the plurality of adsorbents.

While the present techniques may be susceptible to various modifications and alternative forms, the embodiments discussed above have been shown only by way of example. However, it should again be understood that the techniques are not intended to be limited to the particular embodiments disclosed herein. Indeed, the present techniques include all alternatives, modifications, and equivalents falling within the true spirit and scope of the appended claims.

What is claimed is:

1. A method for adsorbing contaminants from a gas stream, the method comprising:
    flowing the gas stream through a plurality of separate trays in a treating vessel, each of the plurality of separate trays comprising a moving bed of adsorbents to adsorb contaminants in the gas stream;
    flowing the adsorbents in each of the plurality of separate trays directly out of the treating vessel and into a fluidized bed of a regenerator without being flowed onto another of the plurality of separate trays;
    desorbing the contaminants from the adsorbents in the fluidized bed of the regenerator to form regenerated adsorbents;
    cooling the regenerated adsorbents; and
    returning the cooled, regenerated adsorbents to the treating vessel.

2. The method of claim 1, wherein the adsorbents comprise a blend of different adsorbent types.

3. The method of claim 1, wherein the adsorbent moves counter-current to the gas stream in the treating vessel at a flow rate of about 0.4 cm/s to about 4 cm/s.

4. The method of claim 1, wherein desorbing the contaminants in the gas stream comprises flowing a regeneration gas into the regenerator at a velocity of about 8 cm/s to about 50 cm/s.

5. The method of claim 1, comprising adjusting a particle size of the adsorbents to substantially match fluidization characteristics.

6. The method of claim 1, comprising adjusting the amount of regenerated adsorbents before reintroduction into the treating vessel.

7. The method of claim 1, wherein the regenerated adsorbents are cooled via a cooler before reintroduction into the treating vessel.

8. The method of claim 1, wherein each tray contains a different blend of various adsorbent types.

9. The method of claim 1, comprising flowing the adsorbents out of the treating vessel and into a plurality of fluidized bed regenerators, wherein each fluidized bed regenerator is associated with one of the plurality of separate trays.

10. The method of claim 1, comprising returning a plurality of regenerated adsorbent streams to the treating vessel.

11. The method of claim 1, wherein the adsorbents comprise a plurality of adsorbents selected to adsorb a plurality of contaminants, wherein the adsorbents are based on the type of contaminants, and further comprising:
    blending the plurality of adsorbents; and
    feeding the blend of adsorbents through the treating vessel as a blended moving bed of adsorbents.

12. The method of claim 2, wherein the blend of different adsorbent types comprises molecular sieves, silica gel, activated alumina, metal-organic-framework molecular sieves, zeolite molecular sieves, amine-treated molecular sieves, metal-impregnated adsorbents, or any combinations thereof.

13. The method of claim 1, wherein the adsorbents remove contaminants from a gas stream comprising water, hydrogen sulfide, carbon dioxide, mercaptans, or heavier hydrocarbons, or any combinations thereof.

14. The method of claim 1, wherein a particle size of the adsorbents ranges from about 100 μm to about 5000 μm.

15. The method of claim 1, wherein a particle density of the adsorbents ranges from about 1.4 g/cm–3 to about 5.0 g/cm–3.

16. The method of claim 1, wherein each of the plurality of separate trays are v-shaped.

* * * * *